United States Patent
Angelin (10) Patent No.: US 11,396,342 B2
(45) Date of Patent: Jul. 26, 2022

(54) FRONT SUSPENSION OF THE TELESCOPIC TYPE WITH ANTI-DIVE EFFECT

(71) Applicant: PIAGGIO & C. S.p.A., Pontedera (IT)

(72) Inventor: Paolo Angelin, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 315 days.

(21) Appl. No.: 16/461,188

(22) PCT Filed: Nov. 17, 2017

(86) PCT No.: PCT/IB2017/057211
§ 371 (c)(1),
(2) Date: May 15, 2019

(87) PCT Pub. No.: WO2018/092082
PCT Pub. Date: May 24, 2018

(65) Prior Publication Data
US 2020/0062330 A1    Feb. 27, 2020

(30) Foreign Application Priority Data

Nov. 17, 2016   (IT) .................... 102016000116483

(51) Int. Cl.
*B62K 21/00* (2006.01)
*B62K 25/08* (2006.01)
(Continued)

(52) U.S. Cl.
CPC ............. *B62K 21/00* (2013.01); *B62K 25/08* (2013.01); *B60G 2300/12* (2013.01);
(Continued)

(58) Field of Classification Search
CPC ........ B62K 21/00; B62K 25/08; B62K 25/16; B62K 2025/044; B62K 25/00; B60G 2300/12; B62L 1/08; B62L 1/00
See application file for complete search history.

(56) References Cited

U.S. PATENT DOCUMENTS

2002/0079670 A1   6/2002  Yih
2020/0115001 A1*  4/2020  Weagle ................. B62K 21/02
2020/0324848 A1* 10/2020  Weagle ................. B62K 25/08
(Continued)

FOREIGN PATENT DOCUMENTS

EP      1149532 A1   10/2001
EP      1270395 B1    7/2006
(Continued)

OTHER PUBLICATIONS

International Search Report for corresponding application PCT/IB2017/057211 filed Nov. 17, 2017; dated Mar. 26, 2018.
Written Opinion of the International Searching Authority for corresponding application PCT/IB2017/057211 filed Nov. 17, 2017; dated Mar. 26, 2018.
(Continued)

*Primary Examiner* — Minnah L Seoh
*Assistant Examiner* — Marlon A Arce
(74) *Attorney, Agent, or Firm* — Cantor Colburn LLP (57) ABSTRACT

A front suspension (4) of the telescopic type with anti-dive effect, comprising at least one sheath (32) and at least one stem (36), housed and guided telescopically inside said sheath (32) according to a direction of the fork axis Z-Z, the suspension (4) comprising a foot (44) associated to the sheath (32) or to the stem (36) that rotatably supports a wheel spindle (44) of an associable front wheel (12) defining a rotation axis X-X, a braking device (52) for the associable front wheel (12), having a support (56) rotatably mounted with respect to the wheel spindle (44) so as to be able to oscillate about the rotation axis X-X. Between the support (56) of the braking device (52) and the foot (44) of the suspension (4) are interposed transfer means (64) of the braking force, exerted by the braking device (52), on an element (32, 36) between the sheath (32) and the stem (36) that does not support the foot (44). Said transfer means (64)

(Continued)

comprise a cam (68) hinged to the foot (44) in a first hinge point (72), kinematically connected to the braking means, and mechanically connected to a portion of the suspension (4) integral with the element (32, 36) between the sheath (32) and the stem (36) that does not support (56) the foot (44) so as to transfer thereto, in the direction of the fork axis Z-Z, a part of the braking force.

22 Claims, 7 Drawing Sheets

(51) Int. Cl.
    *B62K 25/16*     (2006.01)
    *B62K 25/04*     (2006.01)
    *B62L 1/08*     (2006.01)

(52) U.S. Cl.
    CPC ........ *B62K 25/16* (2013.01); *B62K 2025/044* (2013.01); *B62L 1/08* (2013.01)

(56) References Cited

U.S. PATENT DOCUMENTS

| | | | |
|---|---|---|---|
| 2021/0031858 A1* | 2/2021 | Iwamoto | B62K 25/16 |
| 2021/0031867 A1* | 2/2021 | Raffaelli | B62K 25/08 |

FOREIGN PATENT DOCUMENTS

| | | | |
|---|---|---|---|
| JP | 59192686 A | | 11/1984 |
| JP | s59192686 | * | 11/1984 |
| JP | 2002187589 A | | 7/2002 |
| WO | 8701670 A1 | | 3/1987 |
| WO | 0013961 A1 | | 3/2000 |
| WO | 03099645 A1 | | 12/2003 |
| WO | 2008113303 A1 | | 9/2008 |

OTHER PUBLICATIONS

Japanese Office Action for corresponding application 2019-525753 dated Feb. 24, 2021.

Indian Search Report for corresponding application 201927018228 filed May 7, 2019; Report dated May 5, 2021.

* cited by examiner

FRONT SUSPENSION OF THE TELESCOPIC TYPE WITH ANTI-DIVE EFFECT

FIELD OF APPLICATION

The present invention relates to a front suspension of the telescopic type with anti-dive effect for vehicles. The present invention applies to both vehicles with endothermic, electrical engine and hybrid solutions, and to human traction vehicles, such as cycles.

PRIOR ART

As is known, a front suspension of the telescopic type, be it traditional or with upside down stems, consists of a fork having stems that telescopically slide with respect to the respective sheaths, in which they are at least partially housed and guided. The fork may be either single-arm or double-arm.

During braking, due to the transfer of load on the front axle of the vehicle, due to deceleration, the telescopic front fork tends to compress and thus 'dive' more than would happen for just the static weight of the vehicle with pilot and any other suspended loads (such as passenger, luggage and the like).

The dive of the front axle, possibly constrained to reaching the end of stroke in compression of the fork stems, has as a direct consequence a significant change in the vehicle balance.

In fact, if one thinks for example of a two-wheel motorcycle, but the same phenomenon also applies to different types of vehicles with more wheels, the trail of the vehicle is reduced, in particular, in the compression step of the telescopic fork. The modification of the trail changes the sensitivity and responsiveness of the handlebar perceived by the pilot. Also, as a result of a poorly controlled and/or excessive dive of the fork, an extension of the rear suspension which is in turn poorly controlled is generally obtained, resulting in the lightening of the rear axle, until the limit condition of detachment of the rear wheel from the ground is achieved, which could result in loss of control of the trajectory set by the pilot.

It should be noted that changing the balance during the dive does not necessarily have negative effects. In other words, on the one hand an excessive dive is certainly negative, since it involves a change in the dynamic balance that can undermine the vehicle and the driver, especially if the end of stroke is reached with relative risk of rebound of the front wheel; on the other hand, a controlled dive of the fork may even facilitate and improve drivability and riding feeling.

In fact, due to the extent of the fork dive, the pilot is able to perceive the dynamic behavior of the vehicle in addition to perceiving, in advance, the achievement of the grip limit of the tire. In addition, a controlled dive of front axle provides better descent to to set a curve both because it facilitates the descent of the front axle and because reducing the trail increases the pilot's responsiveness and thus sensitivity.

As can be inferred from the above, the fork dive causes, depending on its extent, a substantial modification of the dynamic balance of the vehicle. A controlled dive is not only not harmful but improves driveability and manoeuvrability of the vehicle.

Front suspension solutions exist in the art aimed to reduce or control the dive effect in braking.

In the present discussion, the term "antidive" refers to a purely mechanical system acting on a telescopic front suspension whereby, taking advantage of the torque generated by the front brake system (irrespective of the type), the dive that would normally be present in this type of suspension generated by the same braking torque can be managed, more or less perceptibly. Managing the dive basically means reducing it but, as seen, nothing prevents one from canceling or amplifying it (the latter case is referred to as "prodive"). The system may be present on one side only of a dual-arm front suspension (which then has a traditional telescopic fork on one side and a telescopic fork with antidive system on the other side) or on both (which then has two telescopic forks with antidive system). In the case of a single-arm suspension, the antidive system is not necessarily present only on the side where the fork itself is.

Antidive solutions used in the past in case of telescopic front suspension consisted of articulated quadrilateral systems or even simpler ones (direct return); without going into detail, an antidive effect was obtained with these systems tied only to the braking torque and little manageable as a function of the stroke of the front suspension, and thus indirectly a dive with narrow margin of control, with reference to the above.

Due to these limitations, the known quadrilateral type systems were abandoned over the years and currently are no longer used.

The problem of excessive dive under heavy braking thus remains unresolved or rather, such a problem is addressed by further stiffening the suspension to prevent an excessive dive thereof or, worse still, reaching the end of stroke in compression.

The drawback of this strategy is to have an always very rigid suspension (even when not required) so that it can sustain high deceleration and load transfers, but this inevitably leads to easy loss of grip of the front tire; in fact the latter, in the case of very stiff suspension, struggles to follow the roughness of the road surface and basically tends to bounce thereon, thus sensibly reducing the contact forces and thus adherence, with the road surface itself.

DISCLOSURE OF THE INVENTION

The need of solving the drawbacks and limitations mentioned with reference to the prior art is therefore felt.

Such a need is met by a front suspension of the telescopic type with anti-dive effect according to claim 1.

DESCRIPTION OF THE DRAWINGS

Further features and advantages of the present invention will appear more clearly from the following description of preferred non-limiting embodiments thereof, in which.

Elements or parts of elements in common between the embodiments described below are referred to with the same reference numerals.

DETAILED DESCRIPTION

With reference to the above figures, reference numeral 4 globally indicates an overall schematic view of a front suspension of the telescopic type with anti-dive effect according to the present invention.

For the purposes of the present invention, it should be noted that the front suspension may be applied to any type of vehicle 8, be it preferably a motor vehicle, such as a motor cycle, or a human traction vehicle.

The term motorcycle should be considered in a broad sense, encompassing any motor cycle having at least two wheels, i.e. one front wheel 12 and one rear wheel 16. Therefore, this definition also includes three-wheel motorcycles, such as two paired and steering wheels on the front end and one driving wheel at the rear, but also motorcycles that include only one wheel, steering, on the front end and two driving wheels at the rear. Finally, the definition of motorcycle also includes the so-called quads, with two wheels at the front end and two wheels at the rear end.

With the term kinematic connection, each connection must be considered to allow the reciprocal distance of the connected elements to vary over time. The mechanical connection, unlike the kinematic connection, keeps the distance between two constant connection points over time.

The present invention focuses on the front axle 20 of vehicle 8 without discussing the type of frame 24 of the vehicle or the rear axle 28.

For the purposes of the present invention, frames 24 of any shape and size may be used: they may be, for example, trellis type frames, box-shaped, die-cast, and so on.

The front suspension 4 of the telescopic type with anti-dive effect comprises at least one sheath 32 and at least one stem 36, housed and guided telescopically inside said sheath 32 according to a direction of the fork axis Z-Z, in a known manner.

The distance between the positions of maximum approach and maximum mutual distancing between sheath 32 and stem 36 defines the suspension stroke.

Sheath 32 and stem 36 typically, but not exclusively, have circular section.

In a known manner, between stem 36 and sheath 32 there are arranged the suspensions comprising at least one spring and a shock absorber (not shown); typically, said suspensions are at least partially housed into sheath 32 and/or stem 36.

For the purposes of the present invention, the front suspension 4 may be both of traditional type, having sheath 32 positioned at the bottom, connected to the front wheel 12 and stem 36 positioned at the top, kinematically connected to handlebar 40, and of the type with reversed or 'upside down' stems, having stem 36 positioned at the bottom, connected to the front wheel 12 and stem 32 positioned at the top, kinematically connected to handlebar 40.

Moreover, the suspension may be either single-arm or two-arm type.

The front suspension 4 comprises a foot 44 associated to sheath 32 or to stem 36 that rotatably supports a wheel spindle 48 of an associable front wheel 12 defining a rotation axis X-X.

Foot 44 will be associated to sheath 32 in the case of traditional suspension, while it will be associated to stem 36 in the case of suspension with upside down stems.

A braking device 52 is further provided for the associable front wheel 12 which comprises a support 56 rotatably mounted with respect to the wheel spindle 44 so as to be able to oscillate about the rotation axis X-X, as better described hereinafter.

The braking device 52 typically is a calliper for disc brake adapted to exert a braking action on a brake disc 60 integral in rotation with the front wheel 12.

Advantageously, between support 56 of the braking device 52 and foot 44 of suspension 4 are interposed transfer means 64 of the braking force, exerted by the braking device 52, on a portion of the suspension integral to element 32, 36 between sheath 32 and stem 36 that does not support foot 44.

In other words, in case of conventional fork, where foot 44 is associated to sheath 32, the transfer means 64 release the braking force on stem 36 or on a portion of the suspension integral to stem 36. In case of fork with upside down stems, where foot 44 is associated to stem 36, the transfer means 64 release the braking force on sheath 32 or on a portion of the suspension integral to sheath 32.

In general, the transfer means release, in the direction of the fork axis Z-Z, a part of the braking force on a suspended mass of the vehicle, so as to facilitate the extension of the fork. The suspended mass will be integral with sheath 32 in the case of fork with upside down stems while it will be integral with stem 36 in the case of traditional fork. In general, suspended mass means both a mass of the actual fork, suspended with respect to the wheel, and a mass of the frame that supports the fork and which is in turn suspended with respect to the wheel. Therefore, for the protection scope of the present invention, suspended mass means both a suspended mass of the fork and a suspended mass of frame 24 that supports the fork.

The transfer means 64 comprise a cam 68 hinged to foot 44 in a first hinge point 72.

Therefore, foot 44 of the front suspension 4 supports the front wheel spindle 48 (as in a traditional fork) and also acts as a fulcrum to cam 68.

Moreover, cam 68 is kinematically connected to the braking device 52, and is mechanically connected to a portion of the suspension integral with element 32, 36 between sheath 32 and stem 36 that does not support foot 44 so as to transfer to said element 32, 36, in the direction of the fork axis Z-Z, a part of the braking force.

In other words, in the case of conventional fork, in which foot 44 is associated to sheath 32, cam 68 is mechanically connected to stem 36 or to a portion of the suspension integral to stem 36 so as to transfer thereto, in the direction of the fork axis Z-Z, at least a part of the braking force: such a transfer of force opposes the compression of the suspension.

In case of fork with upside down stems, in which foot 44 is associated to stem 36, cam 68 is mechanically connected to sheath 32 or to a portion of the suspension integral to sheath 32 so as to transfer thereto, in the direction of the fork axis Z-Z, at least a part of the braking force.

According to an embodiment, cam 68 is mechanically connected to a portion of the suspension integral with element 32, 36, between sheath 32 and stem 36, which does not support foot 44, by means of a connecting rod 73 hinged, at opposite ends, to cam 68 and to said portion of the suspension integral to element 32, 36 that does not support foot 44.

According to an embodiment, the connecting rod 73 is hinged to cam 68 and to collar 74 integral with said element 32, 36 so as to transfer to this, in the direction of the fork axis Z-Z, a part of the braking force.

Therefore, if cam 68 is hinged to a foot 44 integral to sheath 32, the connecting rod 73 will be hinged to cam 68 and to collar 36 or to a portion of the suspension integral to stem 36;

conversely, if cam 68 is hinged to a foot 44 integral to stem 36, the connecting rod will be hinged to cam 68 and to collar 74 integral to sheath 32, or to a portion of the suspension integral to sheath 32.

In general, as seen, the reaction force generated by the antidive mechanism and due to the braking force, instead of being released on collar 74 can also be released on other components of the suspension rigidly constrained to sheath 32 in the case of a fork with upside down stems, or rigidly constrained to stem 36 in the case of a conventional fork. Such components may for example be a steering plate 75, typically the bottom plate, or any further suspended mass.

Therefore, the use of a collar 74 should be considered as one of the embodiments of the antidive suspension proposed and not binding. What matters is in fact that the reaction to the braking force is released by the antidive suspension on the suspended mass of the vehicle with a component along the fork axis Z-Z such as to control the dive of the suspension itself.

According to an embodiment, cam 68 comprises a curvilinear guide profile 76 that slidably houses a roller 80 in turn hinged at a second hinge point 84 integral with support 56 of the braking device 52 and movable with this, so that said roller 80 transmits to cam 68 only perpendicular forces at a contact point P with the guide profile 76 of cam 68 itself. In particular, roller rotates in an axial-symmetric manner around the second hinge point 84.

In other words, since roller 80 rotates around the second hinge point 84, it is not able to transmit forces to the guide profile 76 that are not passing by the hinge point and perpendicular to the contact point P with the guide profile 76.

According to an embodiment, the guide profile 76 of cam 68 has a centre of curvature C variable along its extension, said centre of curvature C determining a relative eccentricity d variable with respect to the first hinge point 72, the eccentricity d being the distance between the first hinge point 72 and a straight line perpendicular to a contact point P mutual between the guide profile 76 of cam 68 and said roller 80.

Preferably, the guide profile 72 of cam 68 is shaped so as to present at least one portion of no eccentricity d.

As better described below, canceling the eccentricity d involves no transfer of the braking force, in the direction of the fork axis Z-Z, to element 32, 36, between sheath 32 and stem 36, which does not support foot 44. In other words, when eccentricity d is canceled, the antidive effect is canceled irrespective of the extent of the same braking force.

According to an embodiment, the curvilinear guide profile 76 comprises a first curvilinear portion 88 having a first centre of curvature C' eccentric with respect to the first hinge point 72, i.e. having non zero eccentricity d, and a second curvilinear portion 92, tangent and contiguous to the first curvilinear portion (C'), having a second centre of curvature (C") aligned with the first hinge point (72), i.e. having no eccentricity d.

According to further embodiments, the curvilinear guide profile 76 comprises a number of curvilinear portions greater than or equal to 2, said curvilinear portions being tangent to each other in respective connecting portions.

Instead, the guide profile 76 comprises at least one stretch curved as a circumference arc, and, even more preferably, it comprises a plurality of circumference arcs joined together.

The curvilinear guide profile 76 has a slot shape that extends between a first and a second abutment 96, 98, defining the ends-of-stroke in rotation of cam 68.

Figures 10, 11, 12:
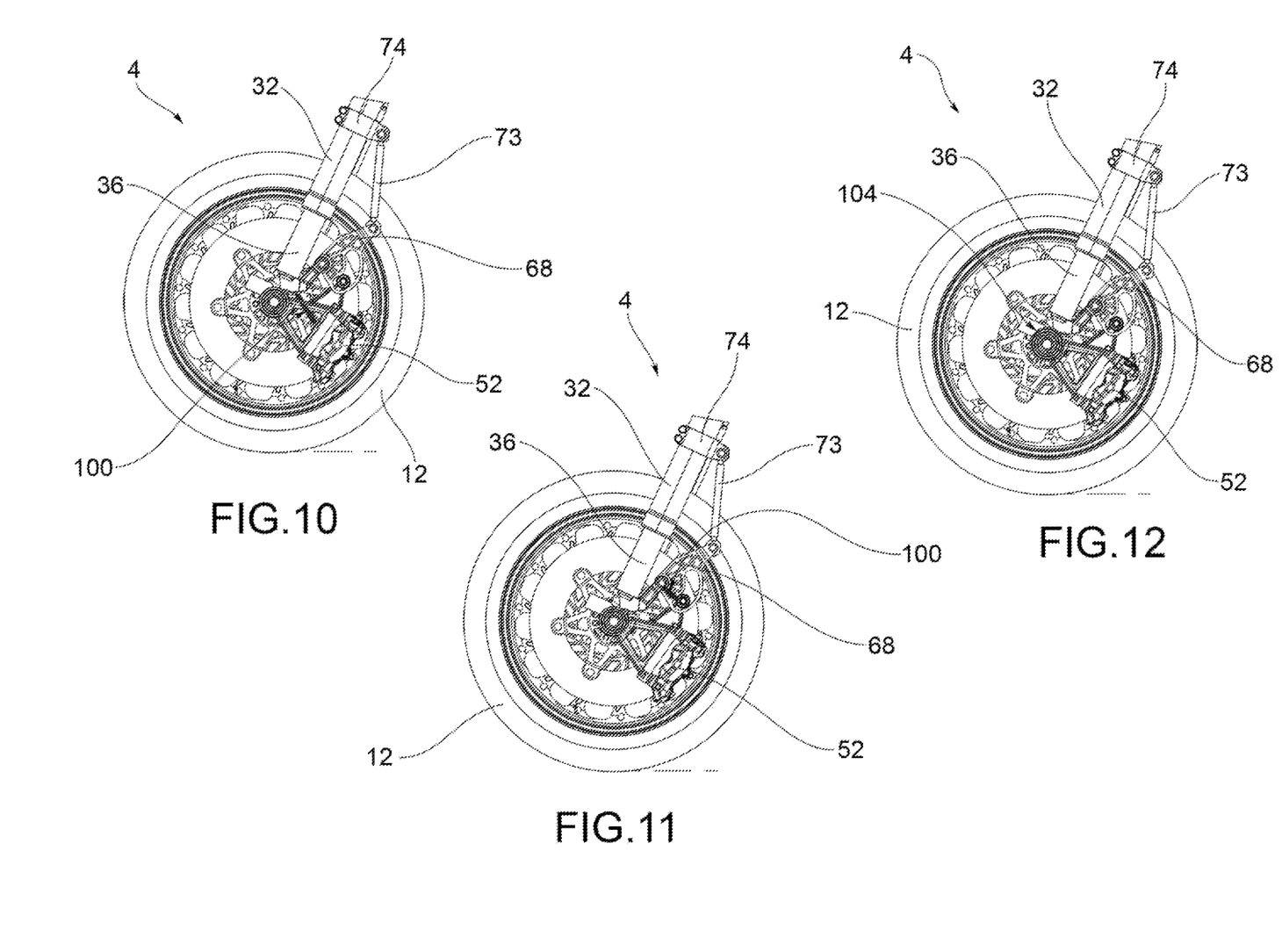
FIGS. 10-12 show side views of suspensions according to embodiment variants of the present invention.

According to a possible embodiment (FIG. 10), there is provided a preloaded traction spring 100 between foot 44 and support 56 of the braking device 52.

For example (FIG. 11), said traction spring 100 connects together a roller fixing screw 80 with the first hinge point 72 of cam 68.

According to a further embodiment (FIG. 12), there is provided a preloaded torsion spring 104 between support 56 of the braking device 52 and the wheel spindle 48.

The purpose of the traction spring 100 and of the torsion spring 104 which may be provided independently of each other or may also coexist in the same embodiment, is to cancel or otherwise limit the clearances and/or the vibrations between the movable parts of the front suspension 4.

To achieve the same purpose, according to a possible embodiment, support 56 of the braking device 52 comprises two oblique bearings 108, 110 arranged in an "X" mounting scheme in correspondence of opposite axial ends of foot 44.

It should be noted that, on the one hand, the braking device 52, typically the calliper for disc brake, must be able to rotate freely around the wheel spindle 48, and on the other hand the assembly clearances should be minimized. The cited 'X' mounting scheme that uses two oblique bearings 108, 110 fulfils this task; preferably, said oblique bearings 108, 100 are preloaded by lock nuts.

This 'X' mounting scheme of the bearings is not binding; the oblique bearings may for example be arranged as an "O", or possibly replaced with ball bearings, roller cages, etc. while still ensuring the free rotation between foot 44 and the braking device 52.

The bearings are preferably dust-shielded.

The operation of a front suspension of the telescopic type with anti-dive effect according to the invention will now be described.

In particular, in order to better understand the operation of the suspension described, it is useful to adopt a mathematical discussion of the forces exchanged between the parts.

Figure 1:
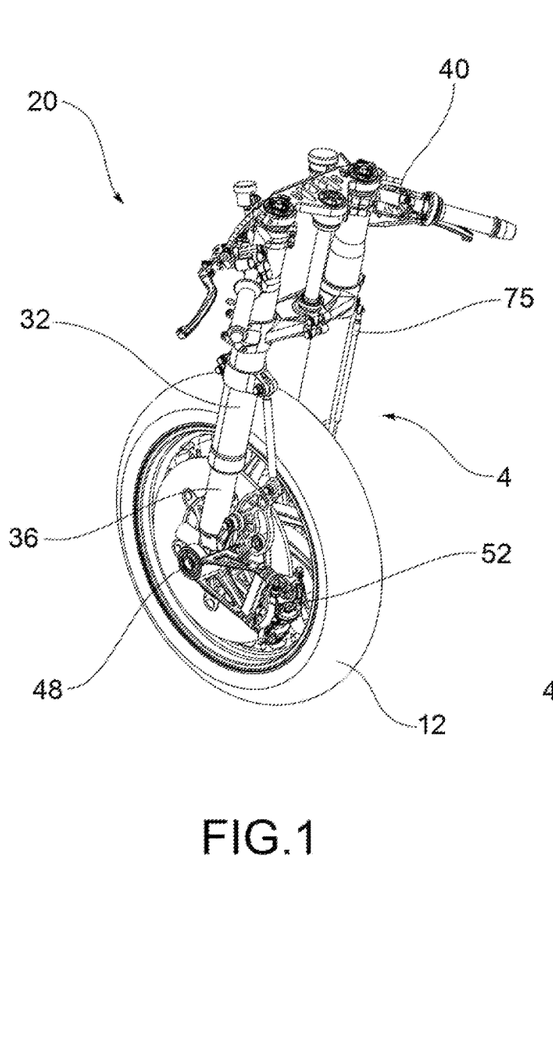
FIG. 1 shows a perspective view of a front suspension 4 according to an embodiment of the present invention.
Figures 2, 4:
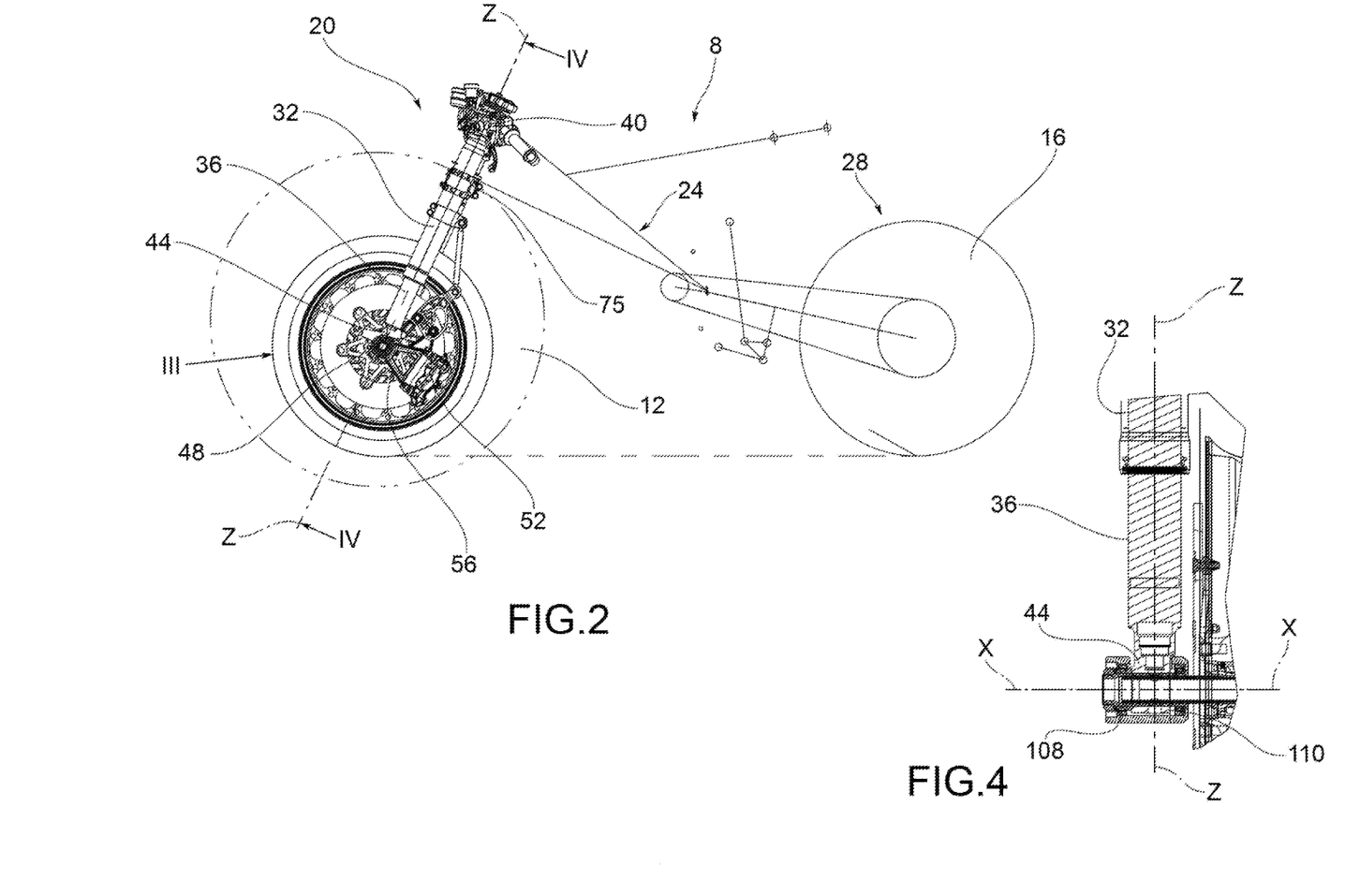
FIG. 2 shows a schematic side view of a motorcycle comprising the suspension in FIG. 1 in a non-dive configuration or maximum extension of the suspension.
FIG. 4 shows a sectional view along the sectional plane IV-IV in FIG. 2.
Figure 3:
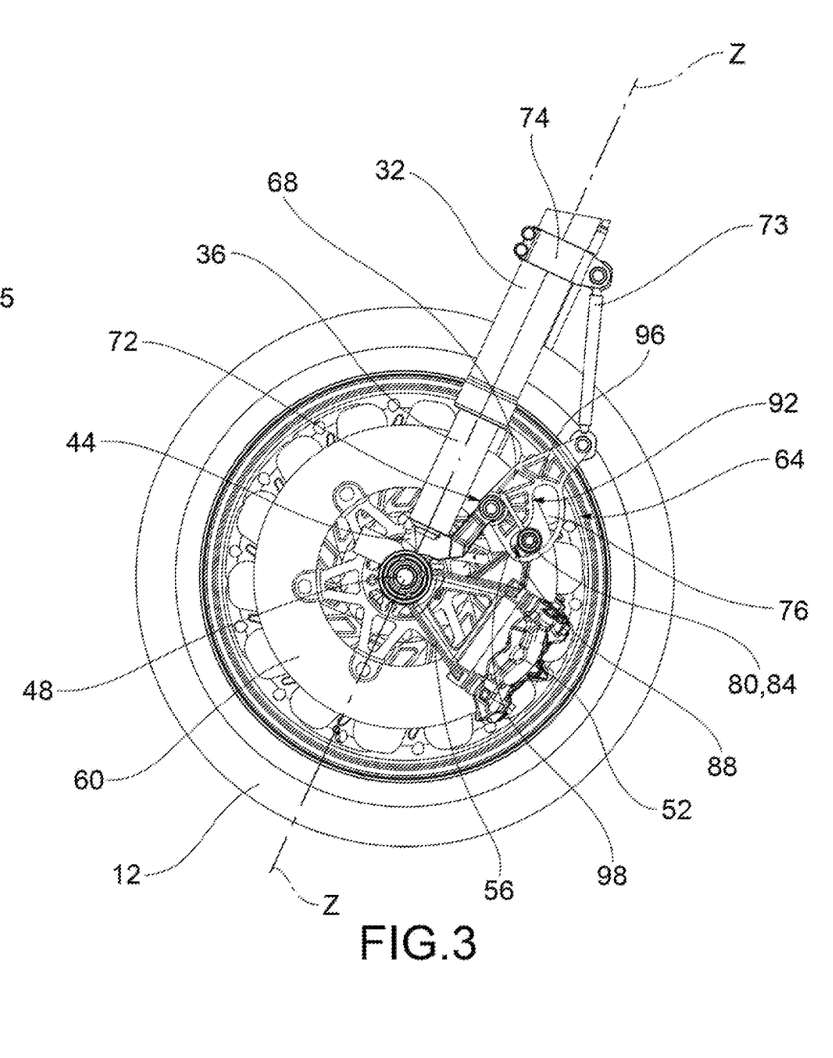
FIG. 3 shows the enlargement of detail III in FIG. 2.
Figures 5, 6:
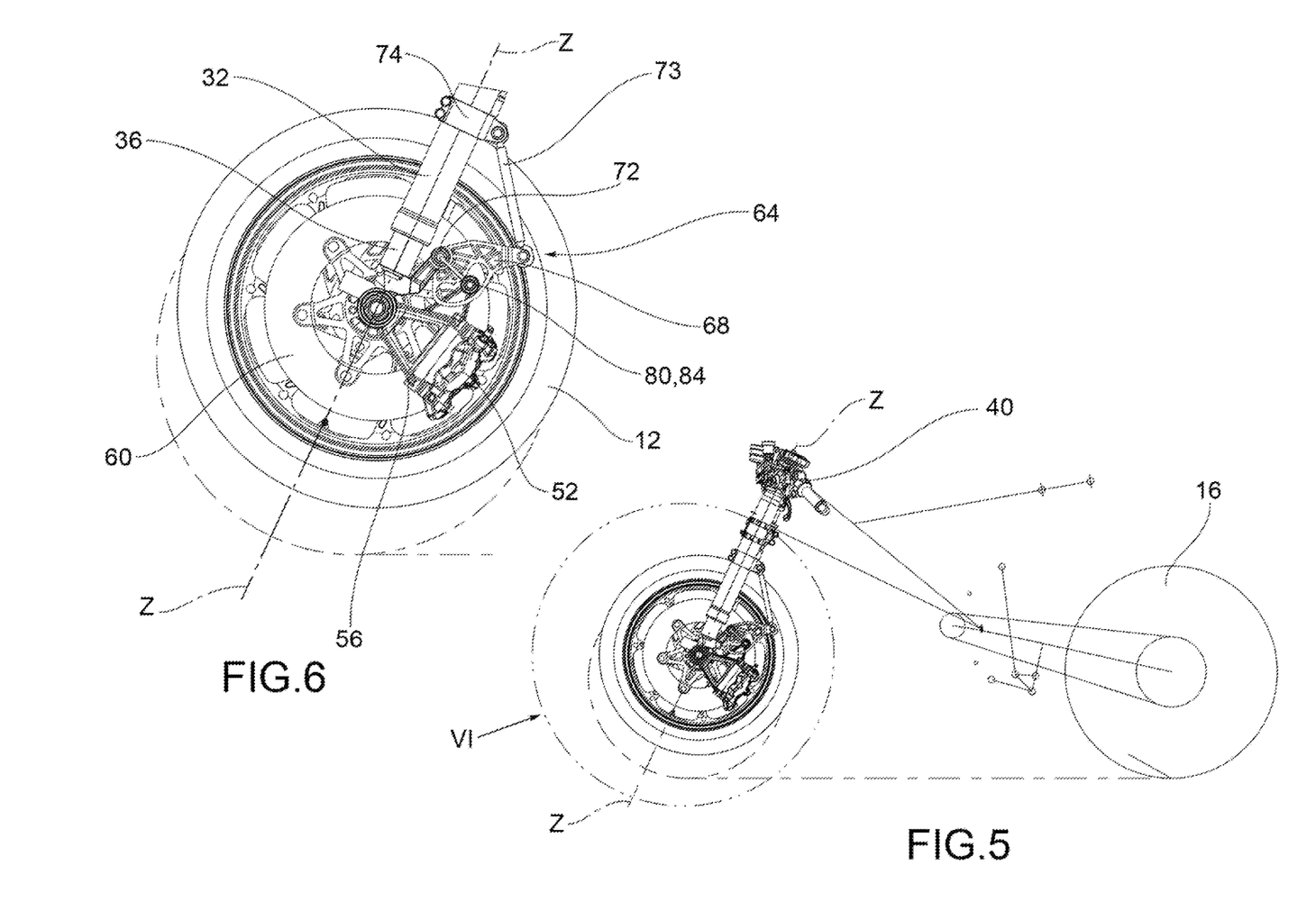
FIG. 5 shows a schematic side view of the motorcycle in FIG. 2 in a partial dive configuration of the suspension.
FIG. 6 shows the enlargement of detail VI in FIG. 5.
Figures 7, 8:
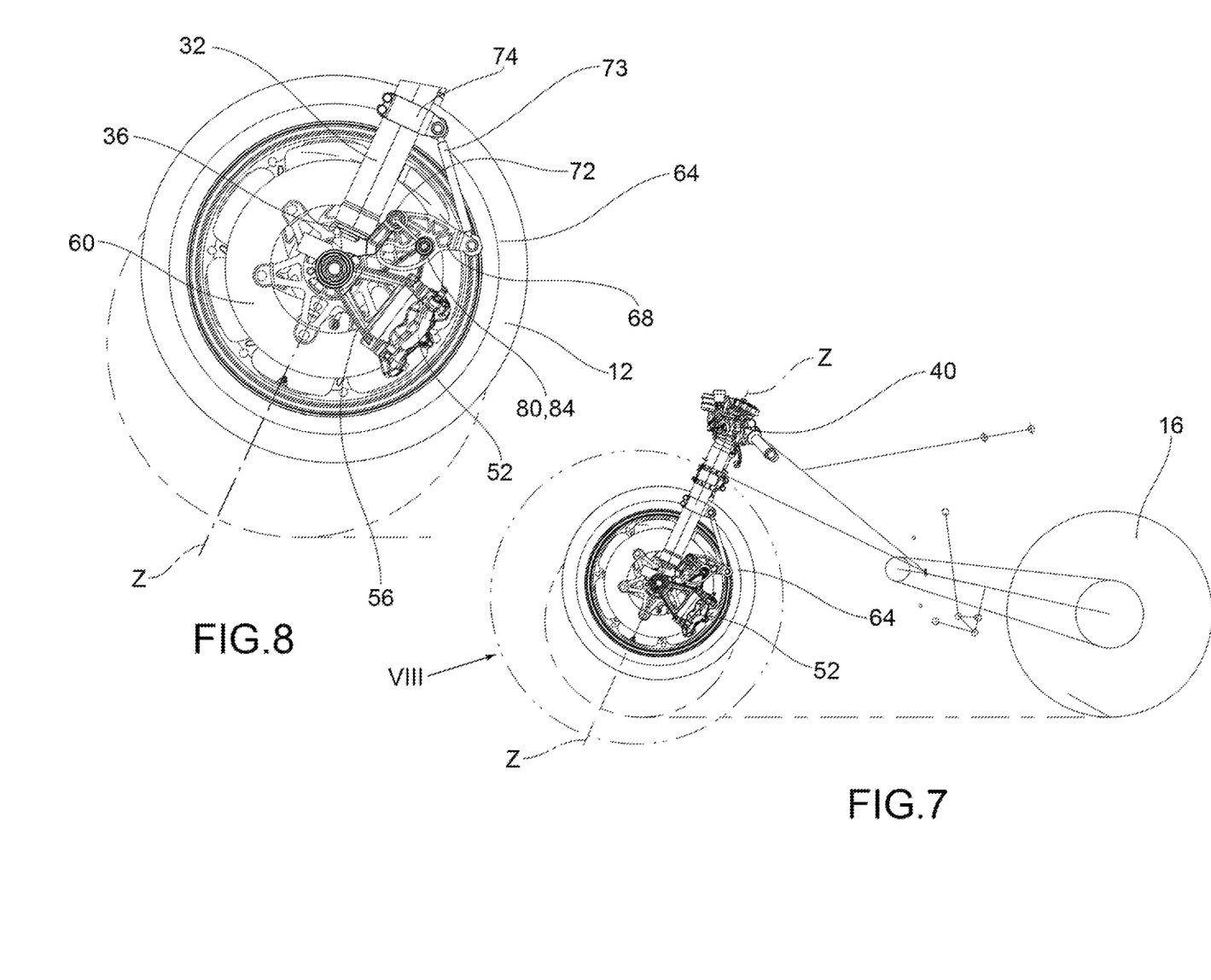
FIG. 7 shows a schematic side view of the motorcycle in FIG. 2 in a maximum dive configuration of the suspension.
FIG. 8 shows the enlargement of detail VIII in FIG. 7.
Figure 9:
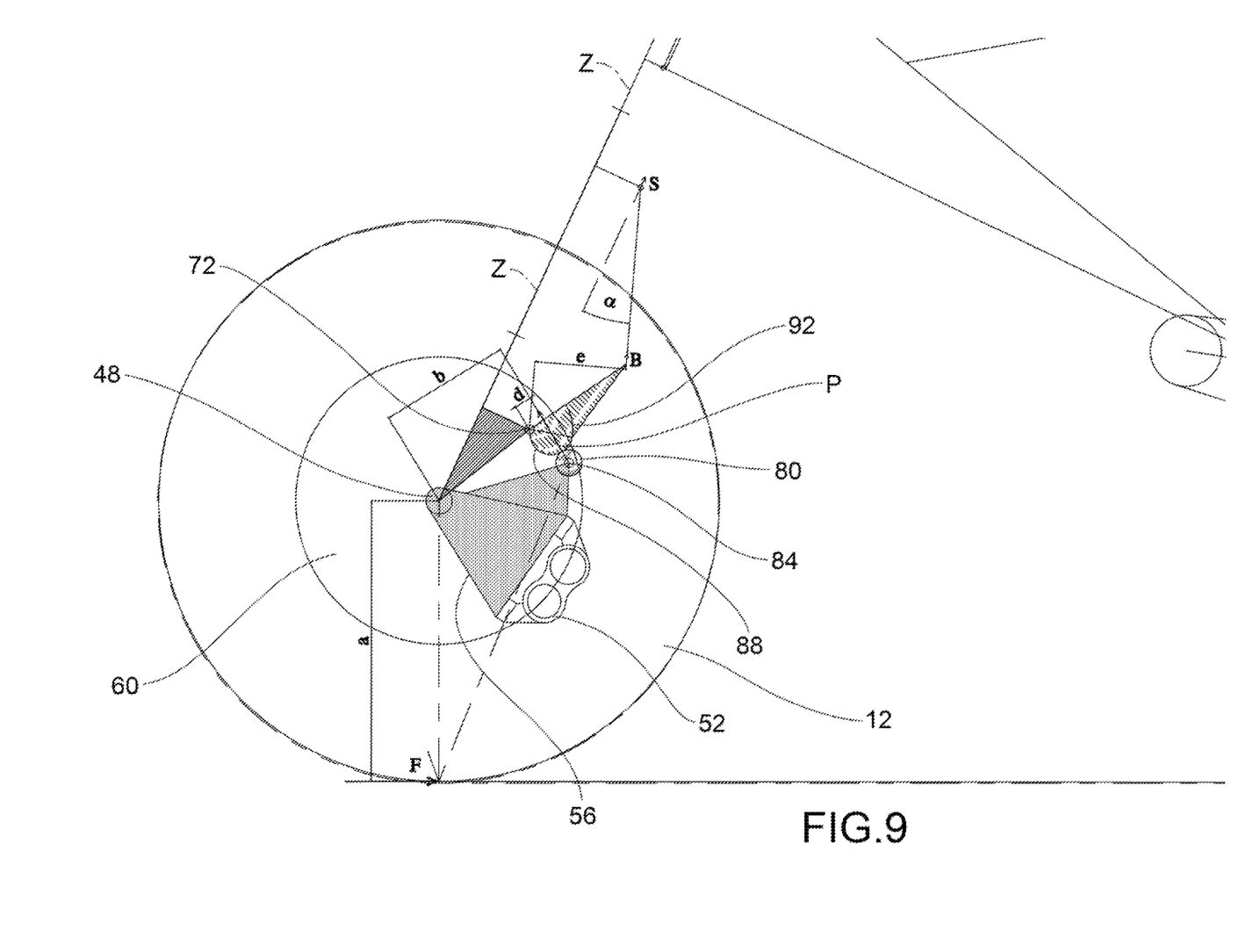
FIG. 9 shows a schematic view of a force scheme of a suspension according to the present invention.

With reference to FIG. 9, the forces at play should first be defined as follows:
  F: longitudinal ground force generated by the braking torque,
  K: normal force to the guide profile 76 of cam 68; i.e. this represents the force that support 56 of the braking device 52 exerts on cam 68;
  B: cam 68 reaction on the connecting rod 73;
  S: force generated by the antidive system in the direction of the fork axis Z-Z, such as to extend the fork, that is, distance stem 36 from sheath 32; in other words, it is the useful component of B that actually generates the antidive effect.

In addition the following magnitudes of the suspension are defined:
  a: distance between the contact point with the ground of the front wheel 12 and the axis of rotation X-X; in other words, 'a' represents the rolling radius of the front wheel 12;

b: distance between the axis of rotation X-X and the straight line normal to the point of contact P between cam 64 and the guide profile 76;

d: eccentricity value, described above;

e: distance between the first hinge point 72 of cam 68 and the straight line of extension of the connecting rod 73 (the distance between a point and a straight line obviously is intended to be measured perpendicular to the straight line itself).

The mathematical model applicable to the suspension provides the balance of moments as follows:

Balance of moments for support 56 of the braking device 52:

$$F*a = K*b \text{ whereby } K = F*a/b;$$

Balance of moments for cam 68:

$$K*d = B*e \text{ whereby } B = K*d/e = F*(a/b)*(d/e)$$

Thrust S $$S = B*\cos(\alpha) = F*(a/b)*(d/e)*\cos(\alpha)$$

Wherein α is the inclination angle of the fork axis Z-Z with respect to the connecting rod 73. As a result, the ratio S/F is defined as follows:

$$S/F = (a/b)*(d/e)*\cos(\alpha)$$

The ratio S/F obtained with the present invention is essential to understand the operation of the suspension.

In particular:

"d", that is, the eccentricity, the magnitude of considerable interest is tied to the guide profile 76 of cam 68: if as a function of the fork stroke, i.e. of sheath 32 with respect to stem 36, this magnitude goes to 0, the ratio S/F goes to 0; that is, in this case, the anidive effect goes to 0 irrespective of the braking force F present (as mentioned above). In the case in the figure (example), we have have a "cam" profile consisting of two arcs of circles, namely the two curvilinear stretches 88, 92 tangent to each other, of which one with a center of curvature C' eccentric with respect to the first hinge point 72 of cam 68 and one aligned with the first hinge point 72 of cam 68. When, at a given stroke of stem 36 or sheath 32, roller 84 of cam 68 goes from the first curvilinear stretch 88 to the second curvilinear stretch 92, eccentricity "d" goes to 0 and thus indirectly, also S, i.e. the antidive thrust goes to 0. The geometry of the guide profile 76 of cam 68 obviously can be any, and the proposed solution is not binding ('n' circle arcs with n>=2 may be used, for example, properly defined spline, etc.);

angle "α" may be managed to vary the S component with equal B; at the same time, one must avoid that by increasing angle "α", an excessive thrust value normal to the fork axis Z-Z is achieved (which could become critical for the fork itself);

"a" varies depending on the roll angle of the vehicle and depends on the geometry of the tire. It is therefore not a parameter on which there is particular flexibility.

The other magnitudes "b" and "e" are more related to geometry (i.e. to overall dimensions) and indirectly to the loads to which the individual components of the antidive system are subjected.

As described above, in general the system uses the torque generated by the front brake to create an axial thrust on the fork which tends to extend it, thus reducing the stroke and dive speed of the same, especially in the first braking phase.

The object of controlling the dive of the front suspension during braking has thus been achieved.

The weight that will then have the "braking point" when establishing the adjustments of the front suspension (stiffness, spring preload and hydraulics) will be reduced as part of the support given by the suspension at this stage will be replaced by the contribution of the anidive system.

The proposed system has the peculiarity of using a "cam" profile: using the variation of eccentricity between the guide profile of the cam and the rotation spindle of the same it is possible to:

decide at what point of the fork stroke end the antidive effect irrespective of the braking force present;

deciding the percentage of axial force generated on the fork with respect to the braking force on the ground.

Figure 13:
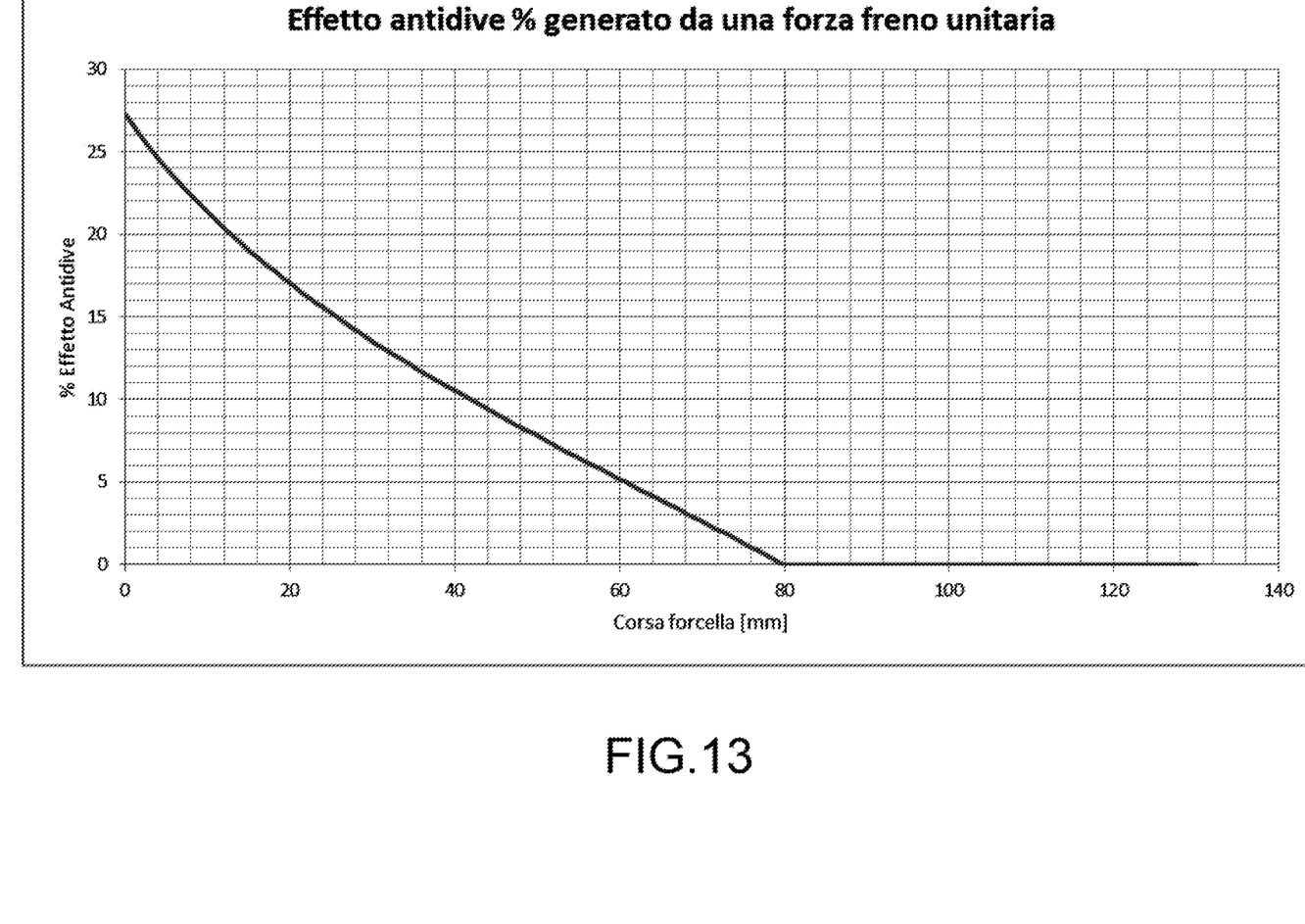
FIG. 13 shows a diagram of the anti-dive force variation of a suspension according to the present invention.

An example of variation of the antidive force of a suspension according to the present invention is shown in FIG. 13, where cam 68 is calibrated so as to have the cancellation of the dive force, or the cancellation of the antidive effect for a dive stroke of the suspension greater than or equal to 80 mm. The abscissa shows the dive stroke, while the ordinate shows the percentage of the antidive force S with respect to a unit braking force F.

As can be understood from the description, the suspension according to the invention allows overcoming the drawbacks of the prior art.

In particular, the suspension according to the present invention establishes, in a very flexible and completely arbitrary manner, and depending on the stroke of the fork (from all compressed to all extended), the ratio of F to S (i.e. between the braking force on the ground and the antidive thrust that opposes the yield or dive of the suspension). One can for example and actually cancel the antidive effect S from a certain dive stroke of the fork on, irrespective of the value of the braking force F using a suitable cam profile. This flexibility is useful for example if one wants, in a cornering maneuver, a concrete antidive effect in the first part of the brake (motorcycle straight and need for support in order to curb more decisively) which then tends to cancel itself towards the curve center (prior to the brake release step), where the conditions of adhesion for the front tire are considerably reduced and the presence of "residual" forces given by the antidive, or simply their cancellation given by the release of the same brake could further limit worsen them.

Therefore, the present invention allows setting the vehicle so as to have the preferred dynamic behavior in order to obtain an antidive effect which is calibrated as a function of the dive stroke and of the extent of braking.

A man skilled in the art may make several changes and adjustments to the suspensions described above in order to meet specific and incidental needs, all falling within the scope of protection defined in the following claims.

The invention claimed is:

1. Front suspension of the telescopic type with anti-dive effect, comprising:

at least one sheath and at least one stem, housed and guided telescopically inside said sheath in a direction of a fork axis, a foot associated to the sheath or to the stem that rotatably supports a wheel spindle of an associable front wheel defining a rotation axis, a braking device for the associable front wheel, having a support rotatably mounted with respect to the wheel spindle so as to be able to oscillate about the rotation axis, wherein between the support of the braking device and foot of the suspension are interposed transfer means of the braking force, exerted by the braking device, on an element between the sheath and the stem that does not support the foot, wherein said transfer means comprise a cam hinged to the foot in a first hinge point, kinematically connected to the braking device, and mechanically connected to a portion of the suspension integral with the element between the sheath and the stem that does not support the foot so as to transfer to said element, in the direction of the fork axis, a part of the braking force.

2. Front suspension of the telescopic type with anti-dive effect according to claim 1, wherein the cam comprises a curvilinear guide profile that slidably houses a roller in turn hinged at a second hinge point integral with the support of the braking device and movable with this, so that said roller transmits to the cam only perpendicular forces at a contact point with the guide profile of the cam itself.

3. Front suspension of the telescopic type with anti-dive effect according to claim 1, wherein said guide profile of the cam has a center of curvature variable along its extension, said center of curvature determining a relative eccentricity variable with respect to the first hinge point, the eccentricity being the distance between the first hinge point and a straight line perpendicular to a contact point mutual between a guide profile of the cam and said roller.

4. Front suspension of the telescopic type with anti-dive effect according to claim 3, wherein the guide profile of the cam is shaped so as to present at least one portion of no eccentricity.

5. Front suspension of the telescopic type with anti-dive effect according to claim 2, wherein said curvilinear guide profile comprises a first curvilinear portion having a first center of curvature eccentric with respect to the first hinge point and a second curvilinear portion, tangent and contiguous to the first curvilinear portion, having a second center of curvature aligned with the first hinge point.

6. Front suspension of the telescopic type with anti-dive effect according to claim 2, wherein the curvilinear guide profile comprises a number of curvilinear portions greater than or equal to 2, said curvilinear portions being tangent to each other in respective connecting portions.

7. Front suspension of the telescopic type with anti-dive effect according to claim 2, wherein the curvilinear guide profile has a slot shape that extends between a first and a second abutment, defining the ends-of-stroke in rotation of the cam.

8. Front suspension of the telescopic type with anti-dive effect according to claim 2, wherein the guide profile comprises at least one portion with arc of circumference.

9. Front suspension of the telescopic type with anti-dive effect according to claim 1, wherein the cam is mechanically connected to a portion of the suspension integral with the element, between the sheath and the stem, which does not support the foot, by means of a connecting rod hinged, at opposite ends, to the cam and to said portion of the suspension integral to the element that does not support the foot.

10. Front suspension of the telescopic type with anti-dive effect according to claim 9, wherein the connecting rod is hinged to the cam and to a collar integral with said element so as to transfer to this, in the direction of the fork axis, a part of the braking force.

11. Front suspension of the telescopic type with anti-dive effect according to claim 9, wherein the connecting rod is hinged to the cam and to a steering plate integral with said element so as to transfer to this, in the direction of the fork axis, a part of the braking force.

12. Front suspension of the telescopic type with anti-dive effect according to claim 9, wherein the connecting rod is hinged to the cam and to a suspended mass of the suspension, integral with said element so as to transfer to this, in the direction of the fork axis, a part of the braking force.

13. Front suspension of the telescopic type with anti-dive effect according to claim 1, wherein there is provided a preloaded traction spring between the foot and the support of the braking device.

14. Front suspension of the telescopic type with anti-dive effect according to claim 2, wherein said traction spring connects together a roller fixing screw with the first hinge point of the cam.

15. Front suspension of the telescopic type with anti-dive effect according to claim 1, wherein there is provided a preloaded torsion spring between the support of the braking device and the wheel spindle.

16. Front suspension of the telescopic type with anti-dive effect according to claim 1, wherein the support of the braking device comprises two oblique bearings arranged in an "X" mounting scheme in correspondence of opposite axial ends of the foot.

17. Front suspension of the telescopic type with anti-dive effect according to claim 1, wherein the support of the braking device comprises two oblique bearings arranged in an "O" mounting scheme in correspondence of opposite axial ends of the foot.

18. Front suspension of the telescopic type with anti-dive effect according to claim 1, wherein the support of the braking device comprises two ball bearings in correspondence of opposite axial ends of the foot.

19. Motorcycle comprising a front suspension of the telescopic type with anti-dive effect according to claim 1.

20. Motorcycle according to claim 19, comprising a frame that supports the front suspension of the telescopic type with anti-dive effect, wherein said transfer means comprise the cam hinged to the foot in the first hinge point, kinematically connected to the braking device, and mechanically connected to a portion of the frame integral with the element between the sheath and the stem that does not support the foot so as to transfer to said element, in the direction of the fork axis, a part of the braking force.

21. Cycle comprising a front suspension according to claim 1.

22. Cycle according to claim 21, comprising a frame that supports the front suspension of the telescopic type with anti-dive effect, wherein the transfer means comprise the cam hinged to the foot in the first hinge point, kinematically connected to the braking device, and mechanically connected to a portion of the frame integral with the element between the sheath and the stem that does not support the foot so as to transfer to said element, in the direction of the fork axis, a part of the braking force.

* * * * *